US012418088B2

(12) United States Patent
Hsu

(10) Patent No.: US 12,418,088 B2
(45) Date of Patent: Sep. 16, 2025

(54) SIGNAL TRANSMITTING DEVICE

(71) Applicant: REALTEK SEMICONDUCTOR CORPORATION, Hsinchu (TW)

(72) Inventor: Chia Hsiang Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 263 days.

(21) Appl. No.: 18/045,752

(22) Filed: Oct. 11, 2022

(65) Prior Publication Data

US 2023/0121466 A1 Apr. 20, 2023

(30) Foreign Application Priority Data

Oct. 14, 2021 (TW) ................................ 110138184

(51) Int. Cl.
*H01P 5/107* (2006.01)

(52) U.S. Cl.
CPC .................................... *H01P 5/107* (2013.01)

(58) Field of Classification Search
CPC .. H01P 3/121; H01P 3/081; H01P 5/10; H01P 3/165; H01P 5/107; H01P 5/085
See application file for complete search history.

(56) References Cited

U.S. PATENT DOCUMENTS

| | | | | |
|---|---|---|---|---|
| 6,822,528 | B2 * | 11/2004 | Dawn | H01P 5/107 333/33 |
| 6,870,438 | B1 | 3/2005 | Shino et al. | |
| 9,927,484 | B2 * | 3/2018 | Kwon | H01L 23/66 |
| 2009/0066597 | A1 | 3/2009 | Yang et al. | |
| 2011/0057741 | A1 | 3/2011 | Dayan et al. | |
| 2014/0285289 | A1 * | 9/2014 | Herbsommer | H01P 3/121 333/248 |
| 2020/0067165 | A1 * | 2/2020 | Rogers | H01Q 13/06 |
| 2020/0211987 | A1 * | 7/2020 | Kitt | H05K 1/144 |

OTHER PUBLICATIONS

Deslandes, D. (2010). Design equations for tapered microstrip-to-substrate integrated waveguide transitions. 2010 IEEE MTT-S International Microwave Symposium. https://doi.org/10.1109/mwsym.2010.5517884.

* cited by examiner

*Primary Examiner* — John W Poos
(74) *Attorney, Agent, or Firm* — WPAT, P.C.; Anthony King

(57) ABSTRACT

A signal transmitting device is configured to transmit a radio frequency signal outputted from a chip. The signal transmitting device includes a substrate and a connecter. The substrate is coupled to the chip. The substrate includes a waveguide, and the waveguide is configured to transmit the radio frequency signal along a first direction. The connecter is coupled to the substrate and configured to extract the radio frequency signal from the substrate to transmit the same along a second direction. The second direction is perpendicular to the substrate.

18 Claims, 5 Drawing Sheets

SIGNAL TRANSMITTING DEVICE

CROSS-REFERENCE TO RELATED APPLICATIONS

This application claims the benefit of priority to Patent Application No. 110138184, filed in Taiwan on Oct. 14, 2021, which is incorporated by reference in its entirety.

TECHNICAL FIELD

The present application relates to a signal transmitting device, particularly to a radio frequency signal transmitting device.

BACKGROUND

Insertion loss is one of the important parameters of the quality of radio frequency signal transmission. When there are different conductors on the transmission path, it is necessary to make proper impedance matching on the path to reduce the insertion loss. Especially when the frequency of the radio frequency signal increases, the insertion loss increases with the rise in frequency. Therefore, how to effectively reduce the insertion loss in radio frequency signal transmission has become an important issue in this field.

SUMMARY OF THE INVENTION

An aspect of the present disclosure provides a signal transmitting device configured to transmit a radio frequency signal outputted from a chip. The signal transmitting device includes a substrate and a connector. The substrate is coupled to the chip. The substrate includes a waveguide. The waveguide is configured to transmit the radio frequency signal along a first direction. The connector is coupled to the substrate, and configured to extract the radio frequency signal from the substrate and transmit the same along a second direction. The second direction is perpendicular to the substrate.

Another aspect of the present disclosure provide a signal transmitting device configured to transmit a radio frequency signal outputted from a chip. The signal transmitting device includes a microstrip, a substrate, and a connector. The microstrip is coupled to the chip and configured to receive the radio frequency signal. The substrate is coupled to the microstrip and configured to transmit the radio frequency signal along a first direction in the transverse electric mode. The connector is configured to extract the radio frequency signal from the substrate along a second direction. The second direction is perpendicular to the first direction.

The signal transmitting device of the present disclosure uses a substrate and through holes on the substrate to form a waveguide to transmit radio frequency signals and vertically conducts the radio frequency signals out of the substrate. Compared with the conventional technology, the signal transmitting device of the present disclosure has better impedance matching and better transmission efficiency.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
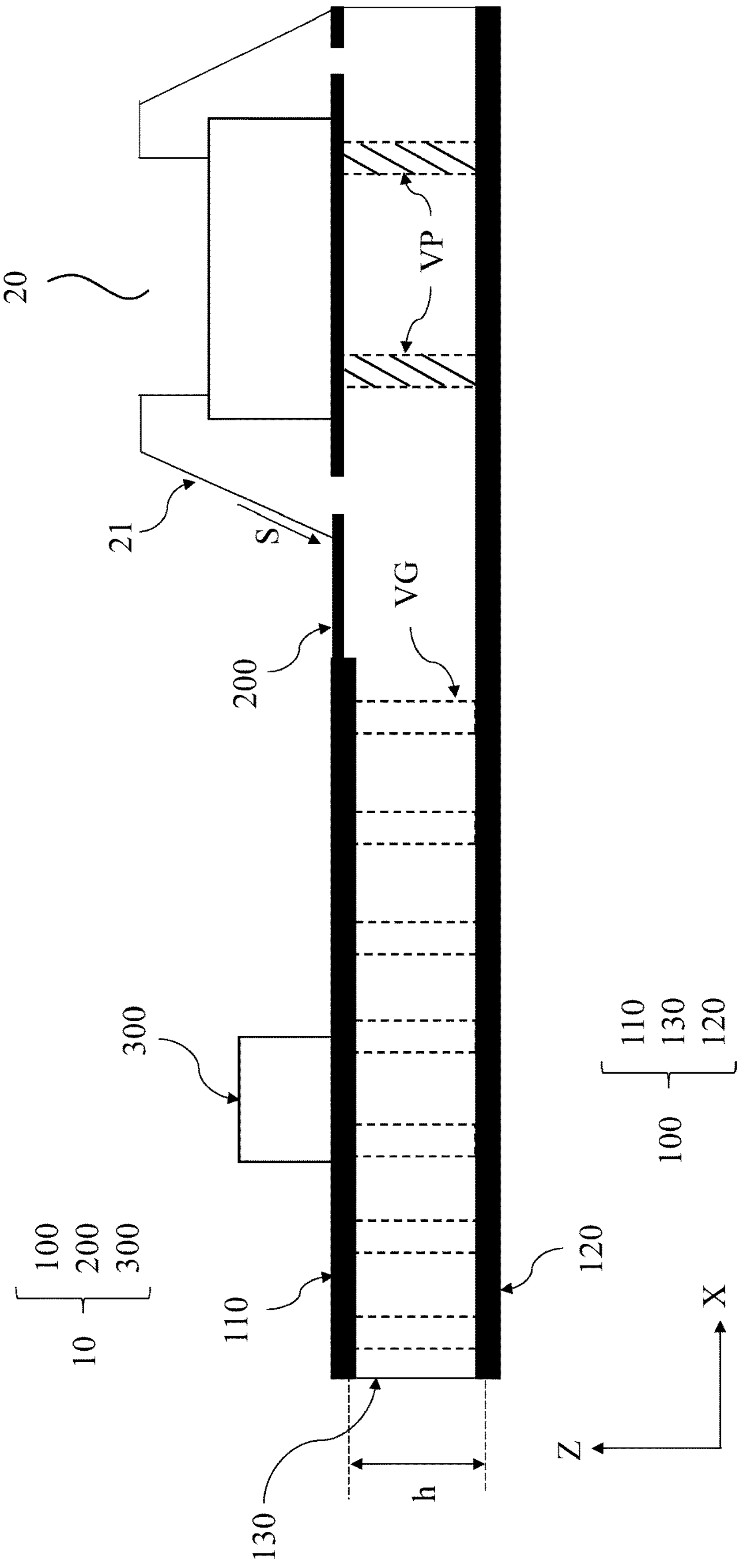
FIG. 1 is a schematic diagram illustrating a signal transmitting device according to some embodiments of the present disclosure.

FIG. 1 is a schematic diagram illustrating a signal transmitting device 10 in the X-Z plane according to some embodiments. The signal transmitting device 10 is configured to transmit a radio frequency signal S outputted from a chip 20. The signal transmitting device 10 includes a substrate 100, a microstrip 200, and a connector 300. The substrate 100 is a bilayer structure having a conductive layer 110 and a conductive layer 120, which are separated by a dielectric layer 130 with a distance h. The chip 20 is disposed on the substrate 100 and is configured to transmit the radio frequency signal S to the microstrip 200 via the pin 21 of the chip 20. The microstrip 200 is coupled between the pin 21 and the conductive layer 110 and configured to transmit the radio frequency signal S to the conductive layer 110. The connector 300 is disposed on the substrate 100 and configured to extract the radio frequency signal S from the substrate 100.

In some embodiments, the substrate 100 is a bilayer printed circuit board, and the microstrip 200 and the conductive layer 110 are monolithic conductive structures on one side of the bilayer printed circuit board. In other words, the monolithic conductive structure disposed above dielectric layer 130 in FIG. 1 is patterned to obtain the microstrip 200 and the conductive layer 110. The conductive layer 120 is a ground layer formed by the monolithic conductive structure on the other side of the bilayer printed circuit board (i.e., below the dielectric layer 130). In some embodiments, the dielectric layer 130 includes dielectric materials of Megtron series, e.g., Megtron 6. The chip 20, the microstrip 200 and the conductive layer 110 are arranged at the same side of the substrate 100. The chip 20 is further connected to the ground by coupling to the conductive layer 120 by a via VP.

In the transmission path of the radio frequency signal S, the radio frequency signal S is transmitted on the microstrip 200 and the substrate 100 along the X direction and transmitted on the connector 300 along the Z direction. Because of the different shapes and materials of the transmission medium and the different transmission directions, the design of the microstrip 200, the substrate 100 and the connector 300 must respond to the frequency and mode of the radio frequency signal S to do impedance matching in order to maintain the transmission quality, as detailed below.

Figure 2:
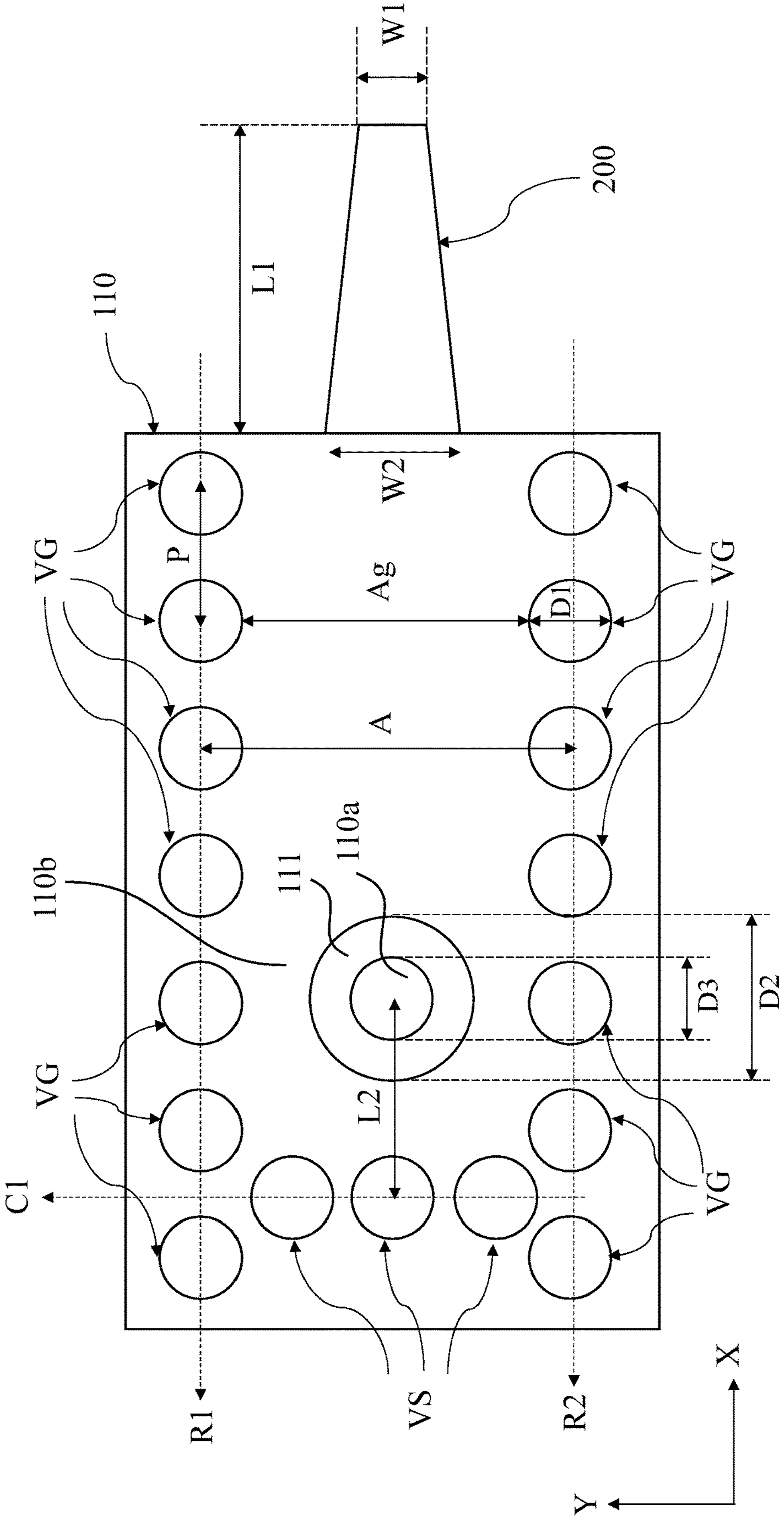
FIG. 2 is a schematic diagram illustrating a conductive layer and a microstrip according to some embodiments of the present disclosure.

FIG. 2 is a schematic diagram illustrating the conductive layer 110 and the microstrip 200 of the substrate 100 in the X-Y plane. The microstrip 200 is trapezoidal in the X-Y plane, with a short side having a length of W1 and a long side having a length of W2, and adjoining the conductive layer 110, wherein the distance between the long side and the short side is L1. In an embodiment, the radio frequency signal S is transmitted in the microstrip 200 in a transverse electromagnetic mode (TEM mode).

In some embodiments, the distance L1 is approximately 0.5- to one-fold of the wavelength of the radio frequency signal S transmitted on the substrate 100. For example, when the frequency of the radio frequency signal S is 60 GHz, the distance L1 can be 2 mm. In this embodiment, the length W1 is about 0.2 mm, and the length W2 is about 0.67 mm.

The substrate 100 includes a plurality of through holes VG and a plurality of through holes VS, wherein the through holes VG and through holes VS have a diameter of D. As shown in FIG. 2, the plurality of the through holes VG are disposed in through hole rows R1 and R2 on the conductive layer 110 along the X direction, and the plurality of the through holes VS are arranged in the through hole column C1 on the conductive layer 110 along the Y direction. Each of the through hole rows R1 and R2 has a same number of through holes VG, and the centers of circle of two adjacent through holes VG in the through hole rows R1 and R2 are spaced by a pitch P. There is a distance A between the center of circle of one through hole VG in the through hole row R1 and the center of circle of a corresponding through hole VG in the through hole row R2. In other words, the distance between the through hole row R1 and the through hole row R2 is A. The shortest distance between the edge of a through hole VG in the through hole row R1 and the edge of a corresponding through hole VG in the through hole row R2 is Ag. The substrate 100 uses the region surrounded by the through hole rows R1, R2 and the through hole column C1 as a waveguide, which is configured to transmit the radio frequency signal S. In some embodiments, the substrate 100 is also referred to as a substrate integrated waveguide (SIW).

In some embodiments, the radio frequency signal S is transmitted in the waveguide in the transverse electric mode (TM mode), such as transmitted in the $TM_{1,0}$ mode. In this embodiment, a conduction frequency of the radio frequency signal S of 60 GHz in the $TM_{1,0}$ mode is about 42.86 GHz. A relationship between the diameter D, the pitch P and the distance A can be obtained from following Equations (1) and (2).

$$f_c = \frac{c}{2\times\sqrt{\varepsilon_r}}\left(\frac{1}{A_{eq}}\right) \tag{1}$$

$$A_{eq} = A - \frac{D^2}{0.95\times P} \tag{2}$$

wherein $f_c$ is a cutoff frequency of the radio frequency signal S, c is the speed of light, and $\varepsilon_r$ is the dielectric constant of the dielectric layer 130.

In some embodiments, the dielectric constant of the dielectric layer 130 is about 3.6, the diameter D is about 0.2 mm, the pitch P is about 0.3 mm, and the distance A is about 1.99 mm.

In some embodiments, the distance Ag and the length W2 can be expressed as the following Equation (3).

$$W2\approx 0.4\times Ag \tag{3}$$

Figure 3:
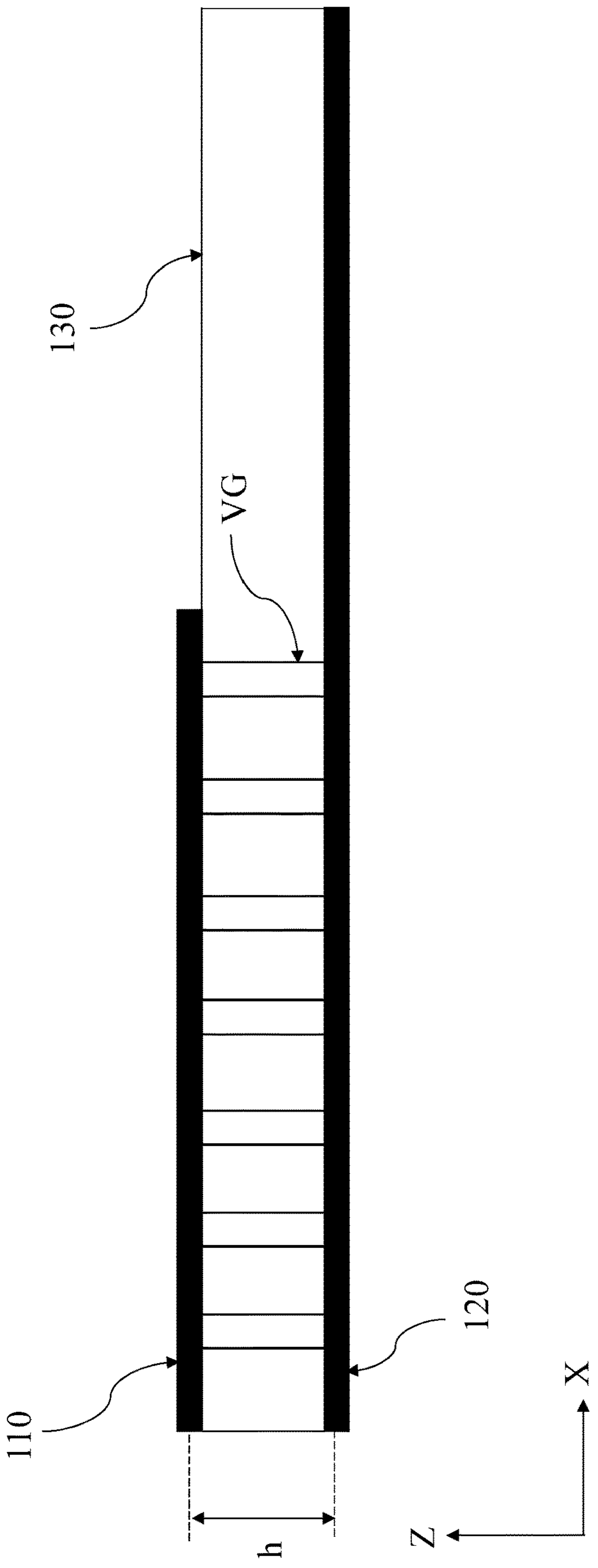
FIG. 3, FIG. 4, and FIG. 5 are schematic cross-sectional views of a signal transmitting device according to some embodiments of the present disclosure.
Figure 4:
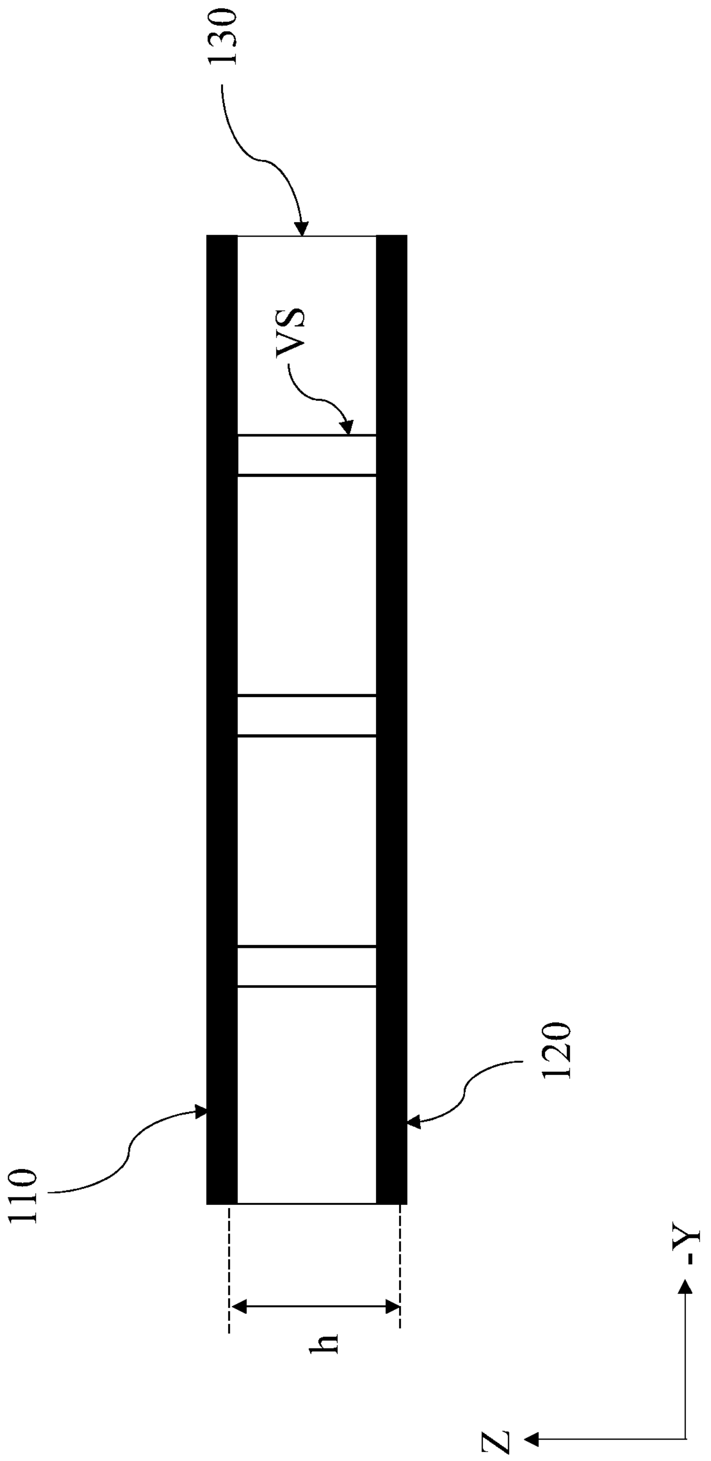

Reference is made to both FIG. 3 and FIG. 4. FIG. 3 is a cross-sectional view of the substrate 100 in the X-Z plane obtained by a cross-sectional line passing through the center of circle of each through hole VG in the through hole column R1. FIG. 4 is a cross-sectional view of the substrate 100 in the X-Z plane obtained by a cross-sectional line passing through the center of circle of each through hole VS in the through hole row C1. The through holes VG and the through holes VS are hollow structures in the dielectric layer 130. The plurality of the through holes VG and the through holes VS penetrate the dielectric layer 130 from the conductive layer 110 to the conductive layer 120 along the Z direction.

Returning to FIG. 2, the conductive layer 110 includes a circular hollow pattern 111. The circular hollow pattern 111 separates the conductive layer 110 into an inner region 110*a* and an outer region 110*b* that are mutually insulated, and the center of circle of the circular hollow pattern 111 and the through hole column C1 are separated by a distance L2. In some embodiments, a diameter D2 of the outer boundary of the circular hollow pattern 111 is about 0.7 mm, and a diameter D3 of the interior boundary forming the hollow pattern 111 is about 0.5 mm.

In some embodiments, the plurality of the through holes VS arranged in the through hole column C1 are also referred to as the short-circuit wall, and the distance L2 between the plurality of the through holes VS and the center of circle of the circular hollow pattern 111 is configured to adjust the impedance matching from the substrate 100 to the connector 300. More specifically, the plurality of the through holes VS arranged in the through hole column C1 are configured to reduce the return loss and insertion loss of the radio frequency signal S transmitted from the substrate 100 to the connector 300, whereas a lower return loss and insertion loss may be achieved when the distance L2 is approximately 0.35-fold of the wavelength of the radio frequency signal S transmitted in the substrate 100. In this embodiment, the distance L2 is about 0.4 mm.

In some embodiments, the impedance matching from the substrate 100 to the connector 300 is independent from the distance between the center of circle of the circular hollow pattern 111 and the microstrip 200.

Figure 5:
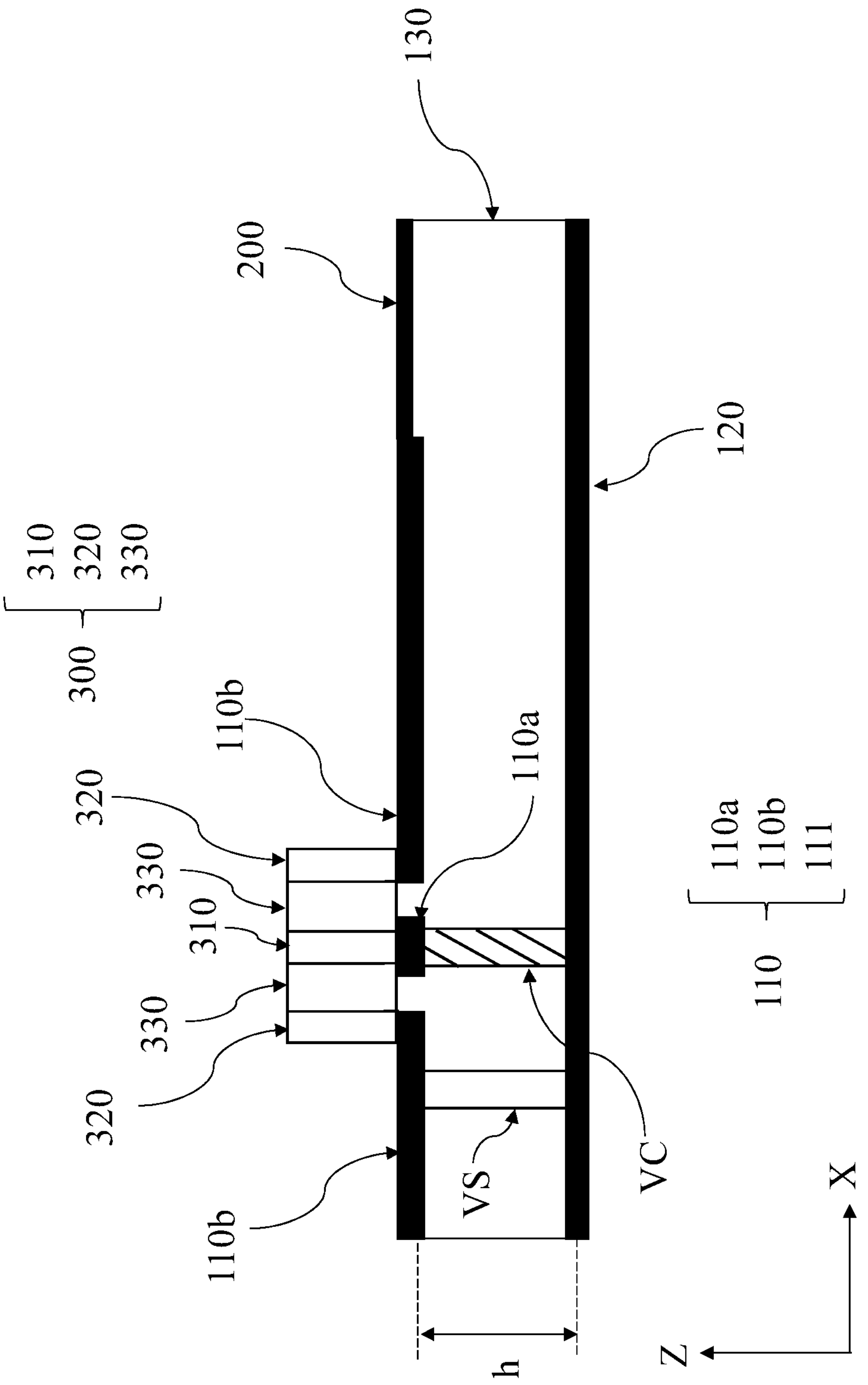

Reference is also made to FIG. 5. FIG. 5 is a cross-sectional view of the substrate 100 in the X-Z plane obtained by a cross-sectional line passing through the center of circle of circular hollow pattern 111 and parallel to the through hole rows R1 and R2. For the ease of understanding, FIG. 5 only illustrates a portion of the structures of the substrate 100 and the microstrip 200. The substrate 100 further includes a via VC, which penetrates the dielectric layer 130 from the conductive layer 110 to the conductive layer 120 along the Z direction. The via VC includes conductive materials and is configured to electrically couple the inner region 110*a* of the conductive layer 110 to the conductive layer 120.

The connector 300 is substantially disposed above the circular hollow pattern 111 of the conductive layer 110. The connector 300 includes an inner conductor 310, an outer conductor 320 and an insulating layer 330. The insulating layer 330 is configured to separate the inner conductor 310 and the outer conductor 320 from each other so that the inner conductor 310 and the outer conductor 320 are electrically insulated. The inner conductor 310 is electrically coupled to the inner region 110*a* of the conductive layer 110 inside the circular hollow pattern 111, such that the inner conductor 310 is also electrically coupled to the via VC and the conductive layer 120. The outer conductor 320 is electrically coupled to the outer region 110*b* of the conductive layer 110 outside the circular hollow pattern 111. The connector 300 is configured to vertically extract the radio frequency signal S along the Z direction, in which the radio frequency signal is originally transmitted on the substrate 100 along the X direction.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A signal transmitting device, configured to transmit a radio frequency signal outputted from a chip, comprising:

a substrate, coupled to the chip, wherein the substrate comprises a waveguide, wherein the waveguide is configured to transmit the radio frequency signal along a first direction; and a connector, coupled to the substrate, and configured to extract the radio frequency signal from the substrate and transmit the same along a second direction, wherein the second direction is perpendicular to the substrate, wherein the substrate further comprises a plurality of through holes, wherein an area of the substrate surrounded by the plurality of through holes forms the waveguide, wherein the substrate further comprises:

a first conductive layer;

a second conductive layer; and a dielectric layer, wherein the first conductive layer and the second conductive layer are stacked and separated by the dielectric layer, wherein the waveguide is at least partially formed by a portion of the first conductive layer, wherein the plurality of through holes comprises a plurality of first through holes, wherein the plurality of first through holes connect the first conductive layer and the second conductive layer along the second direction, wherein the plurality of first through holes are arranged into a first through hole row and a second through hole row along the first direction, wherein the radio frequency signal is transmitted by the first conductive layer and the second conductive layer between the first through hole row and the second through hole row, wherein the portion of the first conductive layer is a portion surrounded by the first through hole row and the second through hole row.

2. The signal transmitting device of claim 1, wherein the plurality of through holes further comprises a plurality of second through holes, wherein the plurality of second through holes connect the first conductive layer and the second conductive layer along the second direction, wherein the plurality of second through holes are arranged in a first through hole column between the first through hole row and the second through hole row and along a third direction, wherein the third direction, the first direction, and the second direction are perpendicular to each other.

3. The signal transmitting device of claim 2, wherein the first conductive layer comprises a circular hollow pattern, wherein the circular hollow pattern is surrounded by the first through hole row, the second through hole row and the first through hole column, a region of the first conductive layer inside the circular hollow pattern is not coupled to a region of the first conductive layer outside the circular hollow pattern.

4. The signal transmitting device of claim 3, wherein a frequency of the radio frequency signal is about 60 GHz, and a distance between a center of circle of the circular hollow pattern and the first through hole column is about 0.35-fold to a wavelength of the radio frequency signal transmitted by the waveguide.

5. The signal transmitting device of claim 3, wherein the dielectric layer further comprises a via connecting the first conductive layer and the second conductive layer along the second direction, wherein the via is configured to electrically connect the region of the first conductive layer inside the circular hollow pattern and the second conductive layer.

6. The signal transmitting device of claim 3, wherein the connector comprises:

an inner conductor, coupled to the region of the first conductive layer inside the circular hollow pattern;

an insulating layer; and an outer conductor, coupled to the region of the first conductive layer outside the circular hollow pattern, wherein the insulating layer is disposed between the inner conductor and the outer conductor.

7. The signal transmitting device of claim 1, wherein the first conductive layer further comprises:

a trapezoidal microstrip, coupled to the chip and the waveguide, wherein the trapezoidal microstrip has a length in the first direction, and the length is about 0.5- to one-fold of a wavelength of the radio frequency signal transmitted by the waveguide.

8. The signal transmitting device of claim 1, wherein the substrate is configured to transmit the radio frequency signal in a transverse electric mode (TE mode).

9. A signal transmitting device, configured to transmit a radio frequency signal outputted from a chip, comprising:

a microstrip, coupled to the chip and configured to receive the radio frequency signal;

a substrate, coupled to the microstrip and configured to transmit the radio frequency signal along a first direction in the transverse electric mode; and a connector, configured to extract the radio frequency signal from the substrate along a second direction, wherein the second direction is perpendicular to the first direction, wherein the substrate comprises a first conductive layer coupled to the microstrip, wherein the first conductive layer and the microstrip are a monolithic conductive structure.

10. The signal transmitting device of claim 9, wherein the substrate further comprises:

a second conductive layer, coupled to a ground terminal; and a dielectric layer, wherein the first conductive layer and the second conductive layer are stacked and separated by the dielectric layer, wherein the first conductive layer is coupled to the connector.

11. A signal transmitting device, configured to transmit a radio frequency signal outputted from a chip, comprising:

a microstrip, coupled to the chip and configured to receive the radio frequency signal;

a substrate, coupled to the microstrip and configured to transmit the radio frequency signal along a first direction in the transverse electric mode; and a connector, configured to extract the radio frequency signal from the substrate along a second direction, wherein the second direction is perpendicular to the first direction, wherein the substrate further comprises:

a first conductive layer, coupled between the microstrip and the connector;

a second conductive layer, coupled to a ground terminal; and a dielectric layer, wherein the first conductive layer and the second conductive layer are stacked and separated by the dielectric layer, wherein the dielectric layer has a plurality of first through holes connecting the first conductive layer and the second conductive layer along the second direction, wherein the plurality of first through holes are arranged into a first through hole row and a second through hole row along the first direction, wherein the microstrip is coupled to the first conductive layer between the first through hole row and the second through hole row.

12. The signal transmitting device of claim 11, wherein the dielectric layer further comprises a plurality of second through holes connecting the first conductive layer and the second conductive layer along the second direction, wherein the plurality of second through holes are arranged into a first through hole column between the first through hole row and the second through hole row and along a third direction, wherein the third direction, the first direction, and the second direction are perpendicular to each other.

13. The signal transmitting device of claim 12, wherein the first conductive layer comprises a circular hollow pattern, wherein the circular hollow pattern is surrounded by the first through hole row, the second through hole row and the first through hole column, a region of the first conductive layer inside the circular hollow pattern is not coupled to a region of the first conductive layer outside the circular hollow pattern.

14. The signal transmitting device of claim 13, wherein the connector comprises:

an inner conductor, coupled to the region of the first conductive layer inside the circular hollow pattern;

an insulating layer; and an outer conductor, coupled to the region of the first conductive layer outside the circular hollow pattern, wherein the insulating layer is disposed between the inner conductor and the outer conductor.

15. The signal transmitting device of claim 13, wherein the dielectric layer further comprises a via connecting the first conductive layer and the second conductive layer along the second direction, wherein the via is configured to electrically connect the region of the first conductive layer inside the circular hollow pattern and the second conductive layer.

16. The signal transmitting device of claim 13, wherein the substrate further comprises a waveguide, and the waveguide is at least partially formed by a portion of the first conductive layer, wherein the portion of the first conductive layer is a region surround by the first through hole row, the second through hole row and the first through hole column.

17. The signal transmitting device of claim 13, wherein a center of circle of the circular hollow pattern and the first through hole column has a distance therebetween, and the distance is about 0.35-fold to a wavelength of the radio frequency signal transmitted by the waveguide, and a frequency of the radio frequency signal is about 60 GHz.

18. The signal transmitting device of claim 9, wherein the microstrip has a length in the first direction, and the length is about 0.5- to one-fold of a wavelength of the radio frequency signal transmitted by the waveguide.

* * * * *